(12) United States Patent
Beuerle et al.

(10) Patent No.: US 9,707,732 B2
(45) Date of Patent: Jul. 18, 2017

(54) BARRIER SYSTEM FOR WIDE MOUTH CONTAINERS

(75) Inventors: Frederick C. Beuerle, Jackson, MI (US); Michael Schmitt, Libertyville, IL (US); John G. Brace, Saline, MI (US)

(73) Assignee: Amcor Limited, Hawthorn, Victoria (AU)

(*) Notice: Subject to any disclaimer, the term of this patent is extended or adjusted under 35 U.S.C. 154(b) by 1182 days.

(21) Appl. No.: 13/428,104

(22) Filed: Mar. 23, 2012

(65) Prior Publication Data
US 2012/0241406 A1 Sep. 27, 2012

Related U.S. Application Data

(60) Provisional application No. 61/467,433, filed on Mar. 25, 2011.

(51) Int. Cl.
| | |
|---|---|
| *B32B 3/00* | (2006.01) |
| *B32B 1/08* | (2006.01) |
| *B65D 1/02* | (2006.01) |
| *B65D 1/10* | (2006.01) |
| *B32B 27/08* | (2006.01) |
| *B32B 27/36* | (2006.01) |

(Continued)

(52) U.S. Cl.
CPC ............... *B32B 1/08* (2013.01); *B32B 27/08* (2013.01); *B32B 27/18* (2013.01); *B32B 27/34* (2013.01); *B32B 27/36* (2013.01); *B65D 1/0207* (2013.01); *B65D 1/10* (2013.01); *B32B 2250/02* (2013.01); *B32B 2270/00* (2013.01); *B32B 2307/7244* (2013.01); *B32B 2439/60* (2013.01); *Y10T 428/1352* (2015.01)

(58) Field of Classification Search
CPC .... C08L 67/02; C08L 77/00; Y10T 428/1352; B29C 49/06; B29B 2911/14093; B29B 2911/1412; B29B 2911/1408; B29B 2911/14066; B29B 2911/14053; B29K 2067/00; B65D 1/0215; B65D 1/023; B65D 1/10; B32B 1/08; B32B 24/34; B32B 27/36
USPC ............................................ 215/40; 428/34.1
See application file for complete search history.

(56) References Cited

U.S. PATENT DOCUMENTS

| | | | | |
|---|---|---|---|---|
| 4,728,549 A | * | 3/1988 | Shimizu .............. | B29C 45/1643 215/12.2 |
| 5,595,799 A | * | 1/1997 | Beck .................. | B29C 45/1646 264/255 |

(Continued)

OTHER PUBLICATIONS

International Search Report and Written Opinion dated Aug. 24, 2012 from corresponding International Patent Application No. PCT/US2012/030283 (six pages).

*Primary Examiner* — Anthony Stashick
*Assistant Examiner* — Ernesto Grano
(74) *Attorney, Agent, or Firm* — Harness, Dickey & Pierce, P.L.C.

(57) ABSTRACT

A container including a shoulder portion terminating at an opening and a sidewall portion extending from the shoulder portion to a base portion. The base portion closes off an end of the container. The shoulder portion, the sidewall portion and the base portion cooperate to define a receptacle chamber within the container into which product can be filled. A barrier layer extends continuously along the base portion, the sidewall portion, and the shoulder portion to the opening and is made of a polymer based material.

8 Claims, 1 Drawing Sheet

(51) Int. Cl.
  *B32B 27/18* (2006.01)
  *B32B 27/34* (2006.01)

(56) References Cited

U.S. PATENT DOCUMENTS

| | | | |
|---|---|---|---|
| 6,057,013 A * | 5/2000 | Ching et al. | 428/35.7 |
| 6,083,585 A * | 7/2000 | Cahill et al. | 428/35.7 |
| 6,228,317 B1 * | 5/2001 | Smith | B65D 1/0223 264/521 |
| 6,280,679 B1 * | 8/2001 | Rashid | B29B 11/08 264/512 |
| 6,365,247 B1 * | 4/2002 | Cahill et al. | 428/35.7 |
| 6,863,988 B2 * | 3/2005 | Tibbitt et al. | 428/480 |
| 7,041,350 B1 * | 5/2006 | Rule et al. | 428/35.7 |
| 7,288,586 B2 * | 10/2007 | Stewart et al. | 524/398 |
| 7,368,153 B2 * | 5/2008 | Barmore et al. | 428/36.7 |
| 7,691,290 B2 * | 4/2010 | Deshpande et al. | 252/188.28 |
| 7,727,605 B2 * | 6/2010 | Darr et al. | 428/35.7 |
| 8,097,662 B2 * | 1/2012 | Schmidt et al. | 523/100 |
| 8,308,005 B2 * | 11/2012 | Penny | 215/329 |
| 2002/0001687 A1 * | 1/2002 | Safian | B05B 11/0043 428/35.7 |
| 2002/0022099 A1 * | 2/2002 | Schmidt et al. | 428/35.7 |
| 2002/0058114 A1 * | 5/2002 | Sung | B29C 45/1684 428/35.7 |
| 2002/0122883 A1 * | 9/2002 | Slat | B29C 49/0005 427/237 |
| 2003/0031814 A1 * | 2/2003 | Hutchinson et al. | 428/35.7 |
| 2003/0039779 A1 * | 2/2003 | Share et al. | 428/35.7 |
| 2003/0082321 A1 * | 5/2003 | Kennedy et al. | 428/35.7 |
| 2003/0108702 A1 * | 6/2003 | Tung et al. | 428/35.7 |
| 2003/0113493 A1 * | 6/2003 | Swenson | 428/35.7 |
| 2003/0211256 A1 * | 11/2003 | Tobias | B29C 49/0073 428/34.1 |
| 2003/0235667 A1 * | 12/2003 | Darr | B32B 27/08 428/35.7 |
| 2004/0068055 A1 * | 4/2004 | Share | B29C 47/0023 525/216 |
| 2004/0071885 A1 * | 4/2004 | Hutchinson et al. | 427/385.5 |
| 2004/0074904 A1 * | 4/2004 | Share et al. | 220/62.22 |
| 2004/0121097 A1 * | 6/2004 | Nahill et al. | 428/35.7 |
| 2004/0146674 A1 * | 7/2004 | Howell et al. | 428/35.7 |
| 2004/0151937 A1 * | 8/2004 | Hutchinson | B29C 33/3828 428/542.8 |
| 2004/0219320 A1 * | 11/2004 | Cochran et al. | 428/35.7 |
| 2005/0089658 A1 * | 4/2005 | Scantlebury et al. | 428/35.7 |
| 2005/0150859 A1 | 7/2005 | Lane et al. | |
| 2005/0181155 A1 * | 8/2005 | Share et al. | 428/35.7 |
| 2005/0181156 A1 * | 8/2005 | Schmidt et al. | 428/35.7 |
| 2006/0029823 A1 * | 2/2006 | Brown | 428/480 |
| 2006/0073294 A1 * | 4/2006 | Hutchinson | B29C 44/04 428/35.7 |
| 2006/0099363 A1 * | 5/2006 | Farha | 428/35.7 |
| 2006/0121222 A1 * | 6/2006 | Andrich et al. | 428/35.7 |
| 2007/0090083 A1 * | 4/2007 | Trude | 215/384 |
| 2007/0160787 A1 * | 7/2007 | Jansen et al. | 428/35.7 |
| 2008/0118690 A1 * | 5/2008 | Stafford et al. | 428/35.7 |
| 2009/0127223 A1 * | 5/2009 | Nahill et al. | 215/379 |
| 2009/0220717 A1 * | 9/2009 | Wilczak | B65D 1/0215 428/36.6 |
| 2010/0196646 A1 * | 8/2010 | Krikor et al. | 428/36.92 |
| 2010/0206838 A1 | 8/2010 | Mast et al. | |
| 2010/0219154 A1 | 9/2010 | Mooney | |
| 2010/0307633 A1 * | 12/2010 | Dierickx | B29B 11/14 141/1 |
| 2011/0091695 A1 * | 4/2011 | Bevilacqua et al. | 428/195.1 |

\* cited by examiner

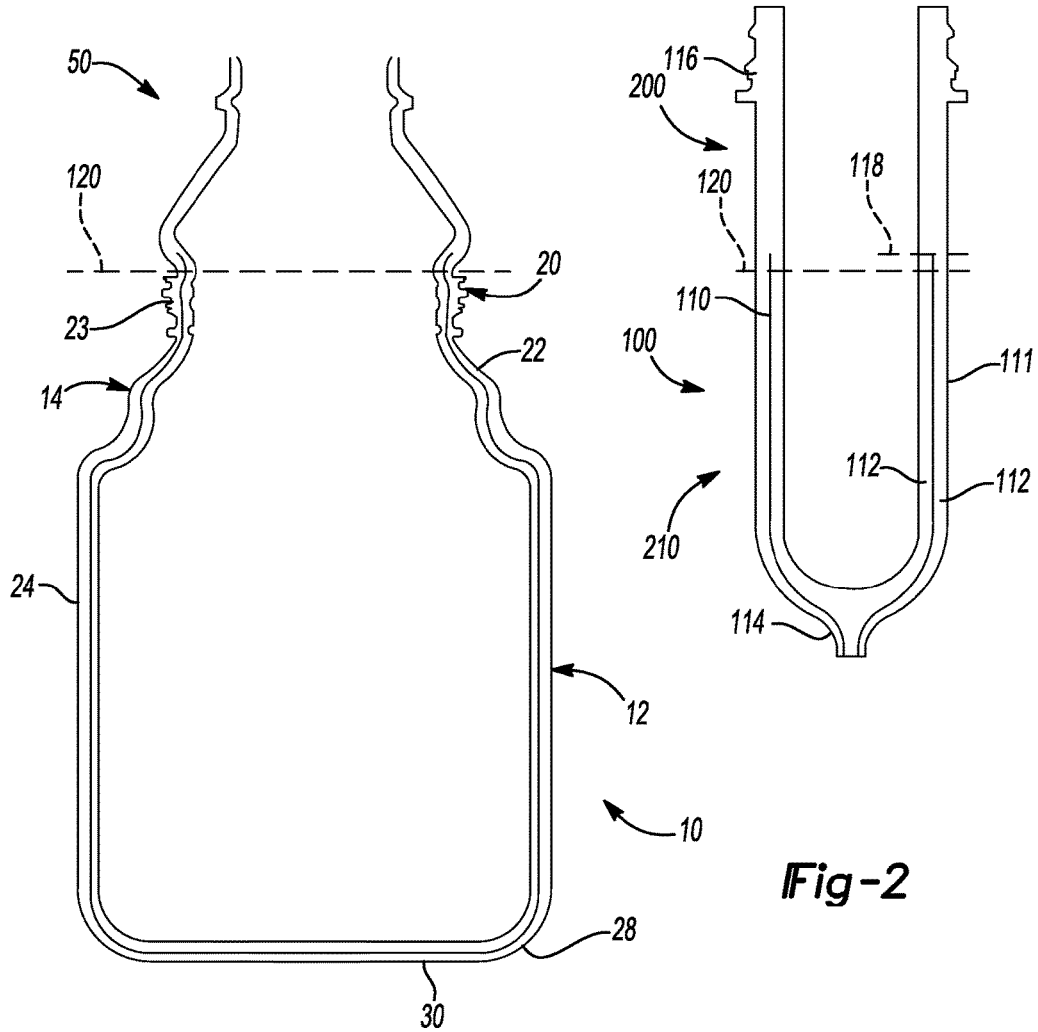

BARRIER SYSTEM FOR WIDE MOUTH CONTAINERS

CROSS-REFERENCE TO RELATED APPLICATIONS

This application claims the benefit of U.S. Provisional Application No. 61/467,433, filed on Mar. 25, 2011. The entire disclosure of the above application is incorporated herein by reference.

FIELD

This disclosure generally relates to containers for retaining a commodity, such as a solid or liquid commodity. More specifically, this disclosure relates to a heat-set, polyethylene terephthalate (PET) container having a cost-effective barrier system for blow-trim applications capable of providing high reuse levels of in-plant regrind and improved container recyclability.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Unfortunately, PET is a poor barrier to oxygen. One of the main factors that limit the shelf life of foods and beverages (herein known as "fills") in PET containers is the ingress of oxygen through the walls of the container followed by oxidation of the fill. Many strategies have been employed to reduce the amount of oxygen in contact with food in PET containers. Some strategies include using package barrier coatings, such as chemical vapor deposited (CVD) aluminum oxide or silicon oxide. Still further, some strategies include the use of PET barrier additives that create physical barriers to oxygen diffusion through the packaging (e.g., nylon, nanoclays). However, these barrier additives may include a monolayer barrier blend that is incorporated into the entire preform resulting in scrap material, such as from a removed dome or moil portion, having high levels of barrier material. This scrap material having high levels of barrier material is incapable of being reused effectively in the plant to manufacture subsequent containers. That is, the high levels of barrier material in the strap material is generally non-conducive to in-plant recycling, thereby leading to excessive material waste and increased manufacturing costs.

In some applications, embedded barrier layers have been incorporated in a multilayer construction of the container to overcome penetration of oxygen into the container. However, such embedded barrier layers can often delaminate if the container is trimmed or otherwise cut improperly. That is, in some cases of container manufacturer, additional portions of the container are created that must be removed prior to final construction along a cut interface. These additional portions may include a dome section and/or moil portion. In some cases, manufacturers have only continued the embedded barrier layer to a position below the intended cut interface, thereby preventing the cut interface from exposing the laminated, multilayer configuration. With this option, it is difficult to control the barrier layer to ensure adequate barrier coverage (that is, that the embedded barrier layer does not stop too short from the finish of the container thereby exposing the contents to oxygen) while also preventing delamination caused by trimming through the multiple layers. In some applications, attempts have been made to heat and curl the finish of the container after trimming to prevent delamination. However, such technique adds additional manufacturing steps and required equipment, thereby increasing costs and time.

SUMMARY

This section provides a general summary of the disclosure, and is not a comprehensive disclosure of its full scope or all of its features.

According to the principles of the present teachings, a container is provided having a shoulder portion terminating at an opening and a sidewall portion extending from the shoulder portion to a base portion. The base portion closes off an end of the container. The shoulder portion, the sidewall portion and the base portion cooperate to define a receptacle chamber within the container into which product can be filled. A barrier layer extends continuously along the base portion, the sidewall portion, and the shoulder portion to the opening and is made of a polymer based material.

According to the principles of the present teachings, a preform for forming a container is provided having a tubular member defining an opening. The tubular member includes a proximal moil-forming section and a distal container-forming section. Barrier material is disposed throughout an entirety of the distal container-forming section and further disposed in a portion of the proximal moil-forming section.

According to the principles of the present teachings, a container assembly is provided having a moil section and a container section coupled to the moil section and separable therefrom along a trim plane. The container section includes a shoulder portion, a sidewall portion extending from the shoulder portion to a base portion, wherein the base portion closes off an end of the container section. The shoulder portion, the sidewall portion and the base portion cooperate to define a receptacle chamber into which product can be filled. Barrier material extends continuously throughout the container section and into a portion of the moil section and is made of a polymer based material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic cross-sectional view of a plastic container and moil constructed in accordance with some embodiments of the present disclosure; and FIG. 2 is a schematic cross-sectional view of a preform constructed in accordance with some embodiments of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure provides for a heat-set, polyethylene terephthalate (PET) container having a cost-effective barrier system for blow-trim applications capable of providing improved layer adhesion, improved oxygen scavenging properties, high reuse levels of in-plant regrind and improved container recyclability.

The present disclosure will be discussed in connection with the construction of the preform and the resultant container. It should be understood, however, that the present teachings should not be regarded as being limited to any particular preform or container shape. That is, the present teachings provide utility for a wide range of preform and container configurations, including containers having a flexible, collapsible, or otherwise configured base, sidewalls, and/or shoulder regions effectively absorbing the internal vacuum forces resulting from a hot-fill operation. Therefore, it should be recognized that variations can exist in the present embodiments.

As illustrated in FIG. 1, the present teachings provide a one-piece plastic, e.g. polyethylene terephthalate (PET), container generally indicated at 10. The container 10 is substantially elongated when viewed from a side. Those of ordinary skill in the art would appreciate that the following teachings of the present disclosure are applicable to other containers, such as rectangular, triangular, pentagonal, hexagonal, octagonal, polygonal, or square shaped containers, which may have different dimensions and volume capacities. It is also contemplated that other modifications can be made depending on the specific application and environmental requirements.

As shown in FIG. 1, the one-piece plastic container 10 according to the present teachings defines a body 12, and includes an upper portion 14 having a cylindrical sidewall forming a finish 20. Integrally formed with the finish 20 and extending downward therefrom is a shoulder portion 22. The shoulder portion 22 merges into and provides a transition between the finish 20 and a sidewall portion 24. The sidewall portion 24 extends downward from the shoulder portion 22 to a base portion 28 having a base 30. In some embodiments, sidewall portion 24 can extend down and nearly abut base 30, thereby minimizing the overall area of base portion 28 such that there is not a discernable base portion 28 when container 10 is uprightly-placed on a surface.

The exemplary container 10 may also have a neck 23. The neck 23 may have an extremely short height, that is, becoming a short extension from the finish 20, or an elongated height, extending between the finish 20 and the shoulder portion 22. The upper portion 14 can define an opening for filling and dispensing of a commodity stored therein.

The finish 20 of the plastic container 10 may include a threaded region having threads, a lower sealing ridge, and a support ring. The threaded region provides a means for attachment of a similarly threaded closure or cap (not illustrated). Alternatives may include other suitable devices that engage the finish 20 of the plastic container 10, such as a press-fit or snap-fit cap for example. Accordingly, the closure or cap (not illustrated) engages the finish 20 to preferably provide a hermetical seal of the plastic container 10. The closure or cap (not illustrated) is preferably of a plastic or metal material conventional to the closure industry and suitable for subsequent thermal processing.

With continued reference to FIG. 1, in some embodiments, plastic container 10 can be formed with a moil portion 50 extending above finish 20. Moil portion 50 can define a portion of the container 10 to be removed following molding of the preform 100 (FIG. 2).

The plastic container 10 has been designed to retain a commodity. The commodity may be in any form such as a solid or semi-solid product. In one example, a commodity may be introduced into the container during a thermal process, typically a hot-fill process. For hot-fill bottling applications, bottlers generally fill the container 10 with a product at an elevated temperature between approximately 155° F. to 205° F. (approximately 68° C. to 96° C.) and seal the container 10 with a closure (not illustrated) before cooling. In addition, the plastic container 10 may be suitable for other high-temperature pasteurization or retort filling processes or other thermal processes as well. In another example, the commodity may be introduced into the container under ambient temperatures.

The plastic container 10 of the present disclosure is a blow molded, biaxially oriented container with a unitary construction from multi-layer material. A well-known stretch-molding, heat-setting process for making the one-piece plastic container 10 generally involves the manufacture of a preform 100 of a polyester material, such as polyethylene terephthalate (PET), having a shape well known to those skilled in the art similar to a test-tube with a generally cylindrical cross section. An exemplary method of manufacturing the plastic container 10 will be described in greater detail later.

As best seen in FIG. 2, the preform 100 can comprise a multi-layer construction including a polymer-based barrier layer 110 generally layered between one or more adjacent layers 112. It should also be recognized that the polymer-based barrier material can also be blended with the PET material to define a container not having discrete layers. However, for the purpose of this present discussion, the polymer-based barrier will be referred to as a layer member, such as polymer-based barrier layer 110.

In some embodiments according to the present teachings, barrier layer 110 can comprise an oxidizable, polyamide-based material, such as Poliprotect. In some embodiments, barrier layer 110 can comprise an oxidizable, polymeric, oxygen-scavenging material, such as OXYCLEAR®, AMOSORB®, and the like. Barrier layer 110 can be blended with PET to improve layer adhesion between two or more of the barrier layer 110 and the adjacent layer(s) 112. That is, barrier layer 110 can be made of a blend of PET and an oxidizable, polymeric, oxygen-scavenging material. In some embodiments, the blend can include at least 80% PET and less than or equal to 20% of an oxidizable, polymeric, oxygen-scavenging material. In some embodiments, the blend can include at least 99% PET and up to 1% non-PET active scavenger material by weight. This barrier layer can define about 2% to 3% of the thickness of the sidewall portion 24.

The barrier layer 110 can be disposed in preform 100 such that it extends along preform body 111 from a distal tip 114 of preform 100 and continues toward a proximal end 116 of preform 100. In some embodiments, barrier layer 110 extends along preform body 111 to a predetermined position 118. Predetermined position 118, in some embodiments, is defined by a position closer to proximal end 116 than a trim line 120. Trim line 120 can be a plane through which the intermediate container is trimmed to size. The material trimmed from the intermediate container proximal from trim line 120, which is also known as a moil 50 (FIG. 1), represents scrap material. Accordingly, as seen in FIG. 2, a portion of preform 100 above trim line 120 may be referred to as a moil-forming section 200 and the portion of preform 100 below trim line 120 may be referred to as a container-forming section 210. Therefore, it should be appreciated that according to some embodiments of the present teachings, a portion of barrier layer 110 will be contained in the scrap material of the moil-forming section 200, such as less than 0.5% by weight. Moreover, in some embodiments, barrier layer 110 will extend from distal tip 114 of preform 100 and will extend beyond trim line 120 and will be circumferentially complete thereabout, such that barrier layer 110 extends throughout container-forming section 210 and within a portion of moil-forming section 200, such as the lowermost 20% by height.

As described herein, the barrier layer 110 can comprise any one 01 the following materials or any other desired material. It should be understood that polymer-based barrier materials are better for recycling and reuse than polyamide (nylon) based resin systems. By further using these teachings to limit the amount of barrier material required in the container and scrap material results in a final container with improved recyclability and scrap material that can be reused at higher levels within the plant.

TABLE 1

| Layer % | Barrier %/matrix % in layer | Avg. mils in barrier layer | % barrier in total container | % barrier in finished container | % barrier in dome scrap* |
|---|---|---|---|---|---|
| 3.8% | 16.0% OXYCLEAR ® 84.0% 2300K | 0.76 | 0.61% OXYCLEAR ® (balance PET) | 0.74% | ~0.014% |
| 6.0% | 12.0% OXYCLEAR ® 88.0% 2300K | 1.20 | 0.72% OXYCLEAR ® (balance PET) | 0.88% | ~0.016% |
| 8.2% | 8.0% OXYCLEAR ® 92.0% 2300K | 1.64 | 0.66% OXYCLEAR ® (balance PET) | 0.80% | ~0.015% |
| 3.8% | 100% AMOSORB ® 4020 | 0.76 | 3.8% AMOSORB ® (0.38% polybutadiene, balance PET) | 0.46% | ~0.009% |
| 8.2% | 100% POLIPROTECT ® APB | 1.64 | 8.2% PPAPB (~0.41% nylon, balance PET) | 0.50% | ~0.009% |
| 3.8% | 100% AEGIS ® HFX | 0.76 | 3.8% AEGIS ® HFX (~0.1% polybutadiene, ~3.7% nylon-6) | 4.64% | ~0.087% |

*Based on 20% of moil (dome) height for layer height.

According to the principles of the present teaching, this arrangement provides several benefits not found in the prior art. Specifically, but not limited to, the present arrangement provides improved barrier performance using less barrier material, because the barrier layer extends throughout the entire container 10. The materials disclosed herein have been found to provide improved adhesion given better inherent adhesion properties of polymer based scavengers to PET. This arrangement and materials thus provide the ability to trim through the barrier layer 110 without significant delamination. Accordingly, this enables one to minimize the amount of barrier material in the scrap material, thus permitting reuse during in-plant manufacturing. The above will result in improved layer adhesion, oxygen barrier performance, better recyclability, and improved use of in-plant regrind.

An exemplary method of forming the container 10 will be described. A preform version 100 of container 10 includes a support ring, which may be used to carry or orient the preform through and at various stages of manufacture. For example, the preform may be carried by the support ring, the support ring may be used to aid in positioning the preform in a mold cavity, or the support ring may be used to carry an intermediate container once molded. At the outset, the preform may be placed into the mold cavity such that the support ring is captured at an upper end of the mold cavity. In general, the mold cavity has an interior surface corresponding to a desired outer profile of the blown container. More specifically, the mold cavity according to the present teachings defines a body forming region, a moil forming region and an optional opening forming region. Once the intermediate container, has been formed, any moil 50 created by the moil forming region may be severed along the trim line 120 and discarded and/or reused according to the principles of the present teachings.

In one example, a machine (not illustrated) places the preform heated to a temperature between approximately 190° F. to 250° F. (approximately 88° C. to 121° C.) into the mold cavity. The mold cavity may be heated to a temperature between approximately 250° F. to 350° F. (approximately 121° C. to 177° C.). A stretch rod apparatus (not illustrated) stretches or extends the heated preform within the mold cavity to a length approximately that of the intermediate container thereby molecularly orienting the polyester material in an axial direction generally corresponding with the central longitudinal axis of the container 10. While the stretch rod extends the preform, air having a pressure between 300 PSI to 600 PSI (2.07 MPa to 4.14 MPa) assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized air holds the mostly biaxial molecularly oriented polyester material against the mold cavity for a period of approximately two (2) to five (5) seconds before removal of the intermediate container from the mold cavity. This process is known as heat setting and results in a heat-resistant container suitable for filling with a product at high temperatures.

Alternatively, other manufacturing methods, such as for example, extrusion blow molding, one step injection stretch blow molding and injection blow molding, using other conventional materials including, for example, high density polyethylene, polypropylene, polyethylene naphthalate (PEN), a PET/PEN blend or copolymer, and various multilayer structures may be suitable for the manufacture of plastic container 10. Those having ordinary skill in the art will readily know and understand plastic container manufacturing method alternatives.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A container comprising:
a moil portion;
a shoulder portion;
a finish portion between the shoulder portion and the moil section;
a sidewall portion extending from the shoulder portion to a base portion, the base portion closing off an end of the container; the shoulder portion, the sidewall portion and the base portion cooperating to define a receptacle chamber within the container into which product can be filled; and
a barrier layer extending continuously along the base portion, the sidewall portion, and the shoulder portion to the opening, the barrier layer being made of a polymer based material;
wherein:
the barrier layer is made of a blend of PET and an oxidizable, polymeric, oxygen-scavenging material;
the blend is comprised of at least 80% PET and less than or equal to 20% of an oxidizable, polymeric, oxygen-scavenging material;
the moil section comprises less than 0.5% by weight non-PET content; and
the moil section comprises the barrier layer in only a lowermost 20% by height when the container assembly is in a standing position.

2. The container according to claim 1 wherein the barrier layer is made of at least 99% PET and up to 1% non-PET active scavenger material by weight.

3. The container according to claim 1 wherein the barrier layer comprises 2% to 3% of the thickness of the sidewall portion.

4. The container according to claim 1, further comprising:
a second layer being coupled to the barrier layer.

5. A container assembly comprising:
a moil section;
a container section coupled to the moil section and separable therefrom along a trim plane, the container section having a shoulder portion, a sidewall portion extending from the shoulder portion to a base portion, the base portion closing off an end of the container section; the shoulder portion, the sidewall portion and the base portion cooperating to define a receptacle chamber into which product can be filled; and
a barrier material extending continuously throughout the container section and into a portion of the moil section, the barrier material being a polymer based material;
wherein:
the barrier material is made of a blend of PET and an oxidizable, polymeric, oxygen-scavenging material; and
the blend is comprised of at least 80% PET and less than or equal to 20% of an oxidizable, polymeric, oxygen-scavenging material;
the moil section comprises less than 0.5% by weight non-PET content; and
the moil section comprises the barrier material in only a lowermost 20% by height when the container assembly is in a standing position.

6. The container assembly according to claim 5 wherein the barrier layer is made of at least 99% PET and up to 1% non-PET active scavenger material by weight.

7. The container assembly according to claim 5 wherein the barrier layer comprises 2% to 3% of the thickness of the sidewall portion.

8. The container assembly according to claim 5, further comprising:
a second layer being coupled to the barrier layer.

* * * * *

UNITED STATES PATENT AND TRADEMARK OFFICE
CERTIFICATE OF CORRECTION

PATENT NO. : 9,707,732 B2  
APPLICATION NO. : 13/428104  
DATED : July 18, 2017  
INVENTOR(S) : Frederick C. Beuerle et al.

Page 1 of 1

It is certified that error appears in the above-identified patent and that said Letters Patent is hereby corrected as shown below:

Column 9, Claim 1, Line 7, delete "portion;" and insert --section;-- therefor

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*